(12) United States Patent
Huang

(10) Patent No.: US 7,171,850 B2
(45) Date of Patent: Feb. 6, 2007

(54) MAGNIFYING DEVICE FOR TIRE PRESSURE GAGE READING

(76) Inventor: Tien-Tsai Huang, No.4-2, Lane 30, Wu Chyuan St., Pan-Chiao, Taipei (TW)

( * ) Notice: Subject to any disclaimer, the term of this patent is extended or adjusted under 35 U.S.C. 154(b) by 2 days.

(21) Appl. No.: 10/979,061

(22) Filed: Nov. 1, 2004

(65) Prior Publication Data

US 2006/0090560 A1    May 4, 2006

(51) Int. Cl.
*B60C 23/02* (2006.01)

(52) U.S. Cl. .................................................. 73/146.8

(58) Field of Classification Search .................. 73/146, 73/146.8
See application file for complete search history.

(56) References Cited

U.S. PATENT DOCUMENTS

| | | | | |
|---|---|---|---|---|
| 4,793,177 A | * | 12/1988 | Wu et al. .................. | 73/146.8 |
| 4,966,035 A | * | 10/1990 | Huang ....................... | 73/146.8 |
| 5,142,904 A | * | 9/1992 | Le .............................. | 73/146.8 |
| 5,965,822 A | * | 10/1999 | Wu ............................. | 73/744 |
| 6,843,115 B2 | * | 1/2005 | Rutherford ................ | 73/146.8 |
| 2003/0226400 A1 | * | 12/2003 | Rutherford ................ | 73/146.8 |
| 2004/0011123 A1 | * | 1/2004 | Rutherford .................. | 73/146 |

\* cited by examiner

*Primary Examiner*—Edward Lefkowitz
*Assistant Examiner*—Andre Allen
(74) *Attorney, Agent, or Firm*—Pro-Techtor Int'l Services

(57) ABSTRACT

A magnifying device for tire pressure gage reading includes a holding element slidably and removably mounted on a main body of a tire pressure gage, a connecting arm connected at an end to and extending slantingly outward from the holding element, and a magnifying element connected to the other end of the connecting arm opposite to the holding element to align with a reading shown on the tire pressure gage. With the help of the magnifying device, a user may easily and clearly view a magnified image of the reading shown on the tire pressure gage. And, the tire pressure gage is provided with an attaching device, with which a user may conveniently carry the gage or attach the gage to a fixed point.

4 Claims, 3 Drawing Sheets

MAGNIFYING DEVICE FOR TIRE PRESSURE GAGE READING

FIELD OF THE INVENTION

The present invention relates to a magnifying device for tire pressure gage reading that enables a user to easily and clearly view a magnified image of reading of tire pressure shown on a tire pressure gage.

BACKGROUND OF THE INVENTION

Tires for each specific type of vehicle must have a normal internal pressure corresponding to that specific type of vehicle. In the event the internal pressure of a tire (that is, the tire pressure) is too low or too high, it would have adverse influences on driving safety. Therefore, it is necessary to periodically or non-periodically check the tire pressure so as to ensure safe driving.

Tire pressure gage is an instrument for measuring tire pressure, and typically includes a housing forming a main body of the gage, and a measuring head formed at an end of the main body toward an air valve on a tire. The tire pressure gage is internally provided with a measuring stem having scales or graduations lengthwise provided thereon, and a spring. In measuring the tire pressure with the tire pressure gage, the scaled measuring stem projects outward from the main body by a different length, depending on the pressure inside the tire. From the scale corresponding to the projected length of the measuring stem, a measured tire pressure or a reading of the tire pressure is obtained. There is also a digital-type pressure gage on which a tire pressure reading in digits is directly shown on a display of the gage.

Since tires are located at the lowest part of a vehicle, the measuring of tire pressure is done in a relatively limited space. To facilitate easy measuring of tire pressure in a limited space, the tire pressure gage is usually designed to have a small volume, which also enables convenient carrying of the gage. The scales or graduations provided on the miniaturized tire pressure gage are also reduced in size to such an extent that they are not easily and clearly readable and as such, the measured tire pressure cannot be quickly caught sight. Moreover, the angular position of the air valve on the tire also hinders a user from easily and clearly viewing the reading on the tire pressure gage.

SUMMARY OF THE INVENTION

A primary object of the present invention is to provide a magnifying device for tire pressure gage reading, so that a user, particularly an old man or a person with poor sight, could easily and clearly view a magnified image of a tire pressure reading shown on the tire pressure gage.

To achieve the above and other objects, the magnifying device for tire pressure gage reading according to the present invention includes a holding element slidably and removably mounted on a housing of a main body of a tire pressure gage, a connecting arm connected at an end to and slantingly extending outward from the holding element, and a magnifying element connected to the other end of the connecting arm opposite to the holding element to align with a reading shown on the tire pressure gage. With the help of the magnifying device, a user may easily and clearly view a magnified image of the reading shown on the tire pressure gage. The tire pressure gage is provided with an attaching device, with which a user may conveniently carry the gage or attach the same to a fixed point.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
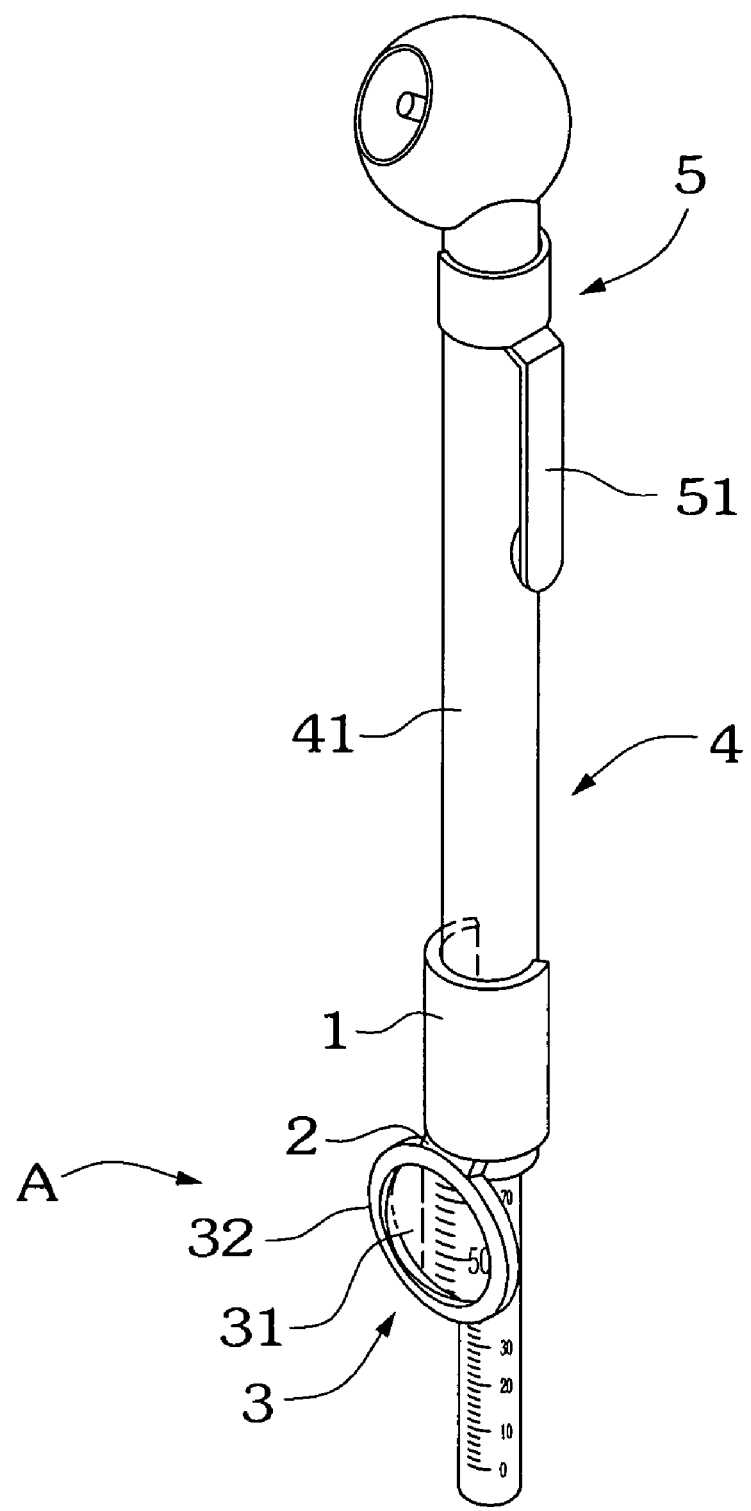
FIG. 1 is a perspective view of a magnifying device for tire pressure gage reading according to a first embodiment of the present invention.
Figure 2:
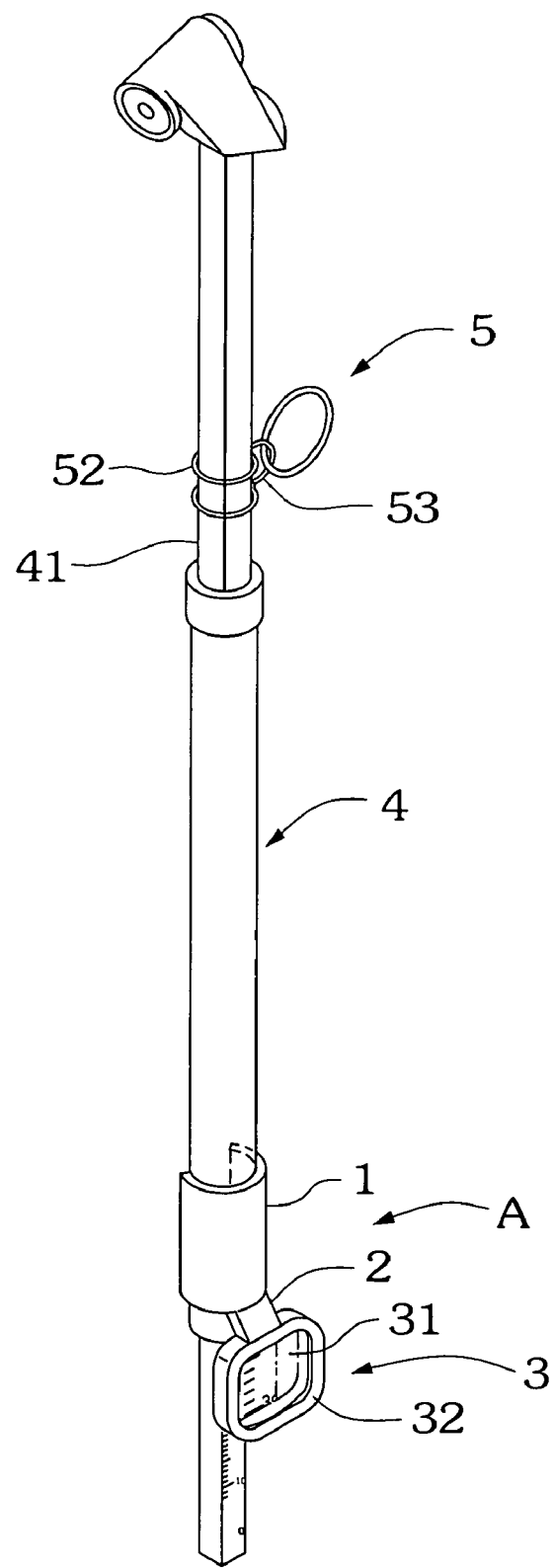
FIG. 2 is a perspective view of a magnifying device for tire pressure gage reading according to a second embodiment of the present invention.
Figure 3:
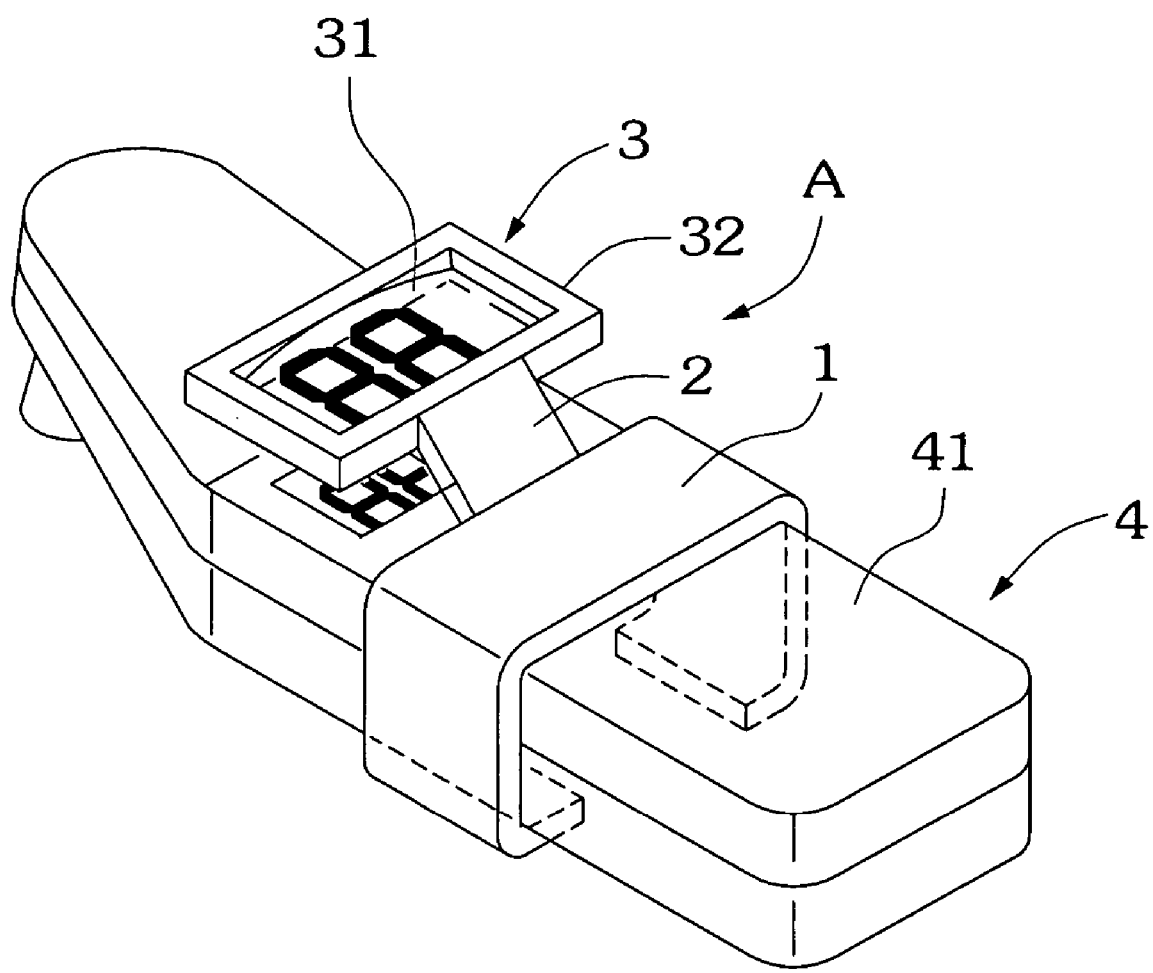
FIG. 3 is a perspective view of a magnifying device for tire pressure gage reading according to a third embodiment of the present invention.

FIGS. 1, 2, and 3 are perspective views of a magnifying device for tire pressure gage reading according to a first, second, and third embodiments of the present invention, respectively.

As shown, the magnifying device for tire pressure gage reading, which is generally denoted by a reference number A, includes a holding element 1, which may be, for example, a C-sectioned sleeve having a side opening, for slidably and removably mounting on a housing of a main body 41 of a tire pressure gage 4, a connecting arm 2 connected at one end to the holding element 1, and a magnifying element 3 connected to the other end of the connecting arm 2 opposite to the holding element 1. The holding element 1, the connecting arm 2, and the magnifying element 3 are all made integrally together in one piece, as shown in FIGS. 1, 2 and 3.

The magnifying element 3 includes a magnifying lens 31, and a frame 32 framing the magnifying lens 31.

The connecting arm 2 extends slantingly outward from the holding element 1 to secure the magnifying element 3 at a raised position relative to the holding element 1, so that a predetermined height difference exists between the magnifying element 3 and the tire pressure gage 4 for the magnifying lens 31 to have a proper focal length to effectively magnify a reading on the tire pressure gage 4.

To use the magnifying device A for tire pressure gage reading, one should first mount the holding element 1 on the main body 41 of the tire pressure gage 4, and then slide the holding element 1 along the main body 41 until the magnifying element 3 is aligned with a reading for tire pressure measured by the tire pressure gage 4 so as to show a magnified image of the reading. At this point, a user may easily and clearly view the tire pressure reading. The reading may be indicated using measuring scales, as shown in FIGS. 1 and 2, or digits, as shown in FIG. 3.

Since the magnifying device A is removably mounted on the tire pressure gage 4, it can be dismounted from the tire pressure gage 4 whenever the latter fails or is too old to be used any longer, and then is mounted on a new tire pressure gage for use again.

To carry or hang the tire pressure gage 4 conveniently, an attaching device 5 is usually provided on the tire pressure gage 4. The attaching device 5 may include, for example, a clip 51 as shown in FIG. 1, which enables a user to carry the tire pressure gage 4 by clamping the clip 51 to the user's pocket. Alternatively, the attaching device 5 may include at least one collar 52 mounted around the main body 41 of the tire pressure gage 4, as shown in FIG. 2, and at least one hanging ring 53 connected to the collar 52 for hanging the tire pressure gage 4 to a fixed point or article, such as a hook (not shown).

The present invention has been described with the above-mentioned preferred embodiments and it is understood that changes and modifications in the described embodiments can be carried out without departing from the scope and the spirit of the invention that is intended to be limited only by the appended claims.

What is claimed is:

1. A magnifying device for tire pressure gage reading, said tire pressure gage including a housing forming a main body thereof, and being adapted to measure a tire pressure and indicate a measured value or reading by scales or digits, said magnifying device comprising:

a holding element, a connecting arm, and a magnifying element, all being made integrally together in one piece;

(a holding element for mounting on said main body of said tire pressure gage) wherein said holding element, for mounting on said main body of said tire pressure gage, is a C-sectioned sleeve having a side opening and is provided for being slidably and removably mounted on said main body of said tire pressure gage;

(a connecting arm connected at a first end to said holding element) wherein said connecting arm is connected at a first end to said holding element, and extends slantingly outward from said holding element to secure said magnifying element at a raised position relative to said main body of said tire pressure gage; and (a magnifying element) wherein said magnifying element including a magnifying lens and a frame for framing said magnifying lens therein, is connected to a second end of said connecting arm opposite to said holding element, and secured at a position aligned with a scale or a digital number indicating a measured tire pressure value or reading so as to magnify said value or reading.

2. The magnifying device for tire pressure gage reading as claimed in claim 1, wherein said main body of said tire pressure gage is provided at a predetermined position with an attaching device.

3. The magnifying device for tire pressure gage reading as claimed in claim 2, wherein said attaching device comprises a clip.

4. The magnifying device for tire pressure gage reading as claimed in claim 2, wherein said attaching device includes at least one collar mounted on said main body of said tire gage, and at least one hanging ring connected to said at least one collar to hanging said tire pressure gage to a fixed point.

* * * * *